(No Model.)
W. C. MERRILL & C. E. WINGO.
PHOTOGRAPHIC APPARATUS FOR HOLDING AND EXPOSING SENSITIVE PLATES.
No. 417,263. Patented Dec. 17, 1889.
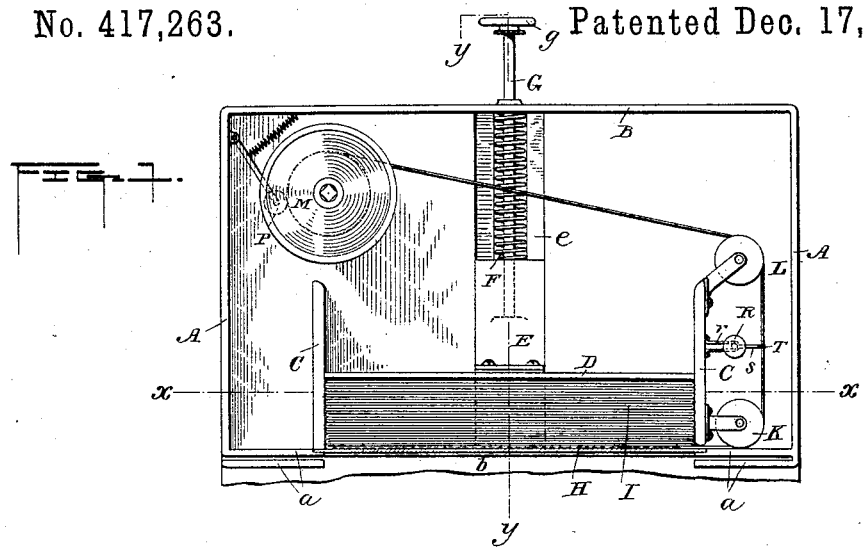
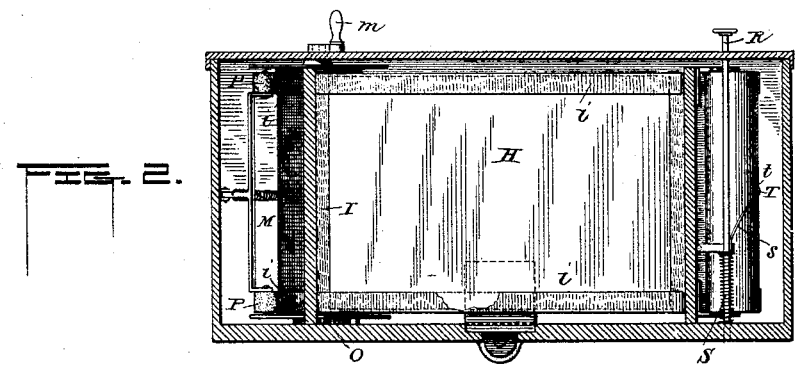
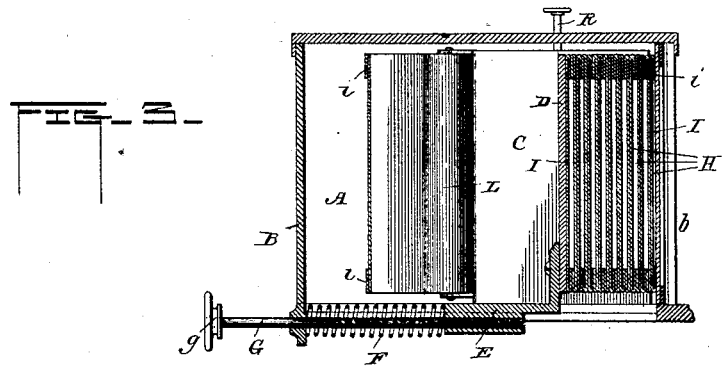

UNITED STATES PATENT OFFICE.

WILLIS CARLETON MERRILL AND CHARLES EDWARD WINGO, OF BALTIMORE, MARYLAND.

PHOTOGRAPHIC APPARATUS FOR HOLDING AND EXPOSING SENSITIVE PLATES.

SPECIFICATION forming part of Letters Patent No. 417,263, dated December 17, 1889.

Application filed January 17, 1889. Renewed November 11, 1889. Serial No. 329,859. (No model.)

*To all whom it may concern:*

Be it known that we, WILLIS CARLETON MERRILL and CHARLES EDWARD WINGO, of Baltimore, in the State of Maryland, have invented certain new and useful Improvements in Photographic Apparatus; and we do hereby declare the following to be a full, clear, and exact description of the invention, such as will enable others skilled in the art to which it appertains to make and use the same.

Our invention relates to an improvement in photographic apparatus.

The object is to provide means for taking a considerable number of impressions consecutively upon independent plates without the necessity of removing the plate-carrier.

A further object is to provide means for carrying the plates which will admit of the removal from and insertion of the plates into the holder without the necessity of the dark room.

A further object is to provide means of the above character which shall be simple and well adapted to photographic work both in the field and in the studio.

With these ends in view our invention consists in certain features of construction and combinations of parts, as will be hereinafter described, and pointed out in the claims.

In the accompanying drawings, Figure 1 is a plan view of a portion of a camera-box with top removed, showing the plates in position for use. Fig. 2 is a vertical section through line $x\ x$ of Fig. 1, and Fig. 3 is a vertical section from front to back through line $y\ y$ of Fig. 1.

A A represent the ends, and B the back, of a camera-box.

$a\ a$ represent the walls at the sides of the opening $b$, through which the plates to receive the impression are exposed. Extending rearwardly from the walls $a$ are two end guides C, between which the plates are to be placed, and a movable platen or follower D is fitted to slide from the rear forwardly between the guides C to present each succeeding plate at the front as soon as a former plate has been removed.

The platen or follower D is fixed to a slide E, fitted to suitable ways $e$ at the bottom of the box, so that it may slide freely forward and back. The slide E, with the platen or follower D fixed thereto, is automatically urged forward by the tension of a spring F, while a rod G, with a suitable handle or knob $g$, is attached to the slide, and serves as a convenient means for withdrawing the platen or follower.

The series of sensitive plates H, which are to receive the impression, are placed in front of the platen or follower D, and are adjusted as follows: The plates are preferably what is known in the art as the "ivory film," a translucent flexible film of recent discovery, although any flexible material suitable for the purpose might be employed. A strip of flexible opaque material I—opaque paper, for example—somewhat wider than the height of the plate, has its edges folded over, as shown at $i$, and the strip itself is folded in zigzag form, as shown in Fig. 1. On the front face of each fold of the strip I one of the plates H is placed with its upper and lower edges beneath the folded edges of the strip. Thus when the plates are placed in the carrying-strip and the folds pressed together there will be in front of each of the plates a layer of the opaque material, and the light will also be effectually excluded from the top and bottom of the plate by the folded-over edges, so that a series of fifty (more or less) of the sensitive plates may be taken from a receptacle and inserted in the camera-box in front of the platen or follower D without danger of exposure to the light.

When it is desired to expose the plates to receive impressions, the flexible strip I is led on one side of the front opening $b$ over a roller K, thence rearwardly over a roller L, and thence to a receiving-roller M. The roller M may be operated by a crank $m$, secured to its spindle, and the strip I, with the plates thereon, be thereby drawn from the folded position in front of the platen or follower D to the receiving-roller, presenting each plate in succession before the opening $b$, the pressure of the platen D forcing them squarely to the front as each preceding plate is removed.

A ratchet O on the end of the roller M may be provided, which, in connection with a spring-actuated pawl on the box, will prevent the retrograde movement of the roller, and we also find it convenient to employ a presser-roller P, under spring-pressure, to prevent the strip I from unwinding as its end leaves the front of the platen.

The roller M is made removable on its spindle, and when the plates and the final portion of the strip of opaque material have been wound thereon it may be freely removed in the sunlight without danger of exposure and another receiving-roller placed in its stead.

In order to check the advance movement of the strip carrying the plates at the proper point to present the succeeding plate squarely in front of the opening $b$, we provide a catch, as follows: A push-rod R has a free vertically-sliding movement in a suitable bearing at or near its foot in the camera-box, and extends upwardly through an elongated loop or socket $r$. The rod R is pressed upwardly at all times by a spring S, and has connected to it a spring-arm $s$, which normally branches away from the rod. The spring-arm $s$ projects through the loop $r$ with the rod, and when the rod is depressed the effect will be to draw the spring-arm $s$ toward the rod. The said spring-arm has a bend T near its free end, which is calculated to engage one of the openings $t$, formed at equal intervals in the strip I. The operator, by pressing down on the rod R, releases the arm $s$ from the strip, and it may then be moved along. The moment the rod R is released, however, the arm $s$ is thrown into position to engage the strip, and as soon as the opening $t$ comes opposite it does so engage it as to prevent its further advance movement.

By the above construction and arrangement a great number of independent plates may be consecutively exposed without handling, the plates may be inserted in and removed from the box in the light, and the plates will be presented squarely in front of the opening without liability of exposing a subsequent plate in any degree.

Having thus fully described our invention, what we claim, and desire to secure by Letters Patent, is—

1. A series of independent sensitive plates connected by flexible opaque material, such material serving to prevent the access of light to the plates, substantially as shown and described.

2. In combination, a folded strip of opaque material and a series of sensitive plates arranged at intervals in and covered by the folds of the strip of opaque material, substantially as set forth.

3. In combination, a box provided with an opening, a strip of opaque material folded in zigzag form within the box, a series of independent sensitive plates carried by the folds of the said folded material, and means for unfolding the strip and presenting the plates before the opening in the box, substantially as set forth.

4. In combination, a box provided with an opening, a movable platen or follower within the box, a folded strip of opaque material in front of the movable platen, and a series of sensitive plates carried by the folds of the opaque flexible material, substantially as set forth.

5. In combination, a box provided with an opening, a series of independent sensitive plates consecutively connected by opaque material serving to prevent the access of light to the plates, and means for moving the plates in front of the opening, substantially as shown and described.

6. In combination, a box provided with an opening, a spring-actuated platen or follower, a strip of opaque material folded in zigzag order in front of the platen, sensitive plates carried at intervals in the folds of the opaque material, and a receiving-roller to store the strip of opaque material with the plates, substantially as set forth.

7. In combination, a strip of opaque material folded in zigzag form and having its edges turned over, and sensitive plates located in the folds of the material, with their edges within the folded edges of the strip, substantially as set forth.

8. In combination, a box with an opening therein, a folded strip of opaque material, sensitive plates carried in the folds of the material, guide-rollers, a receiving-roller, and a spring-actuated catch adapted to automatically engage the strip of opaque material at regular intervals, substantially as set forth.

In testimony whereof we have signed this specification in the presence of two subscribing witnesses.

WILLIS CARLETON MERRILL.
CHARLES EDWARD WINGO.

Witnesses:
G. ERETT REARDON,
J. EDWARD BENNETT.